Figure 1:
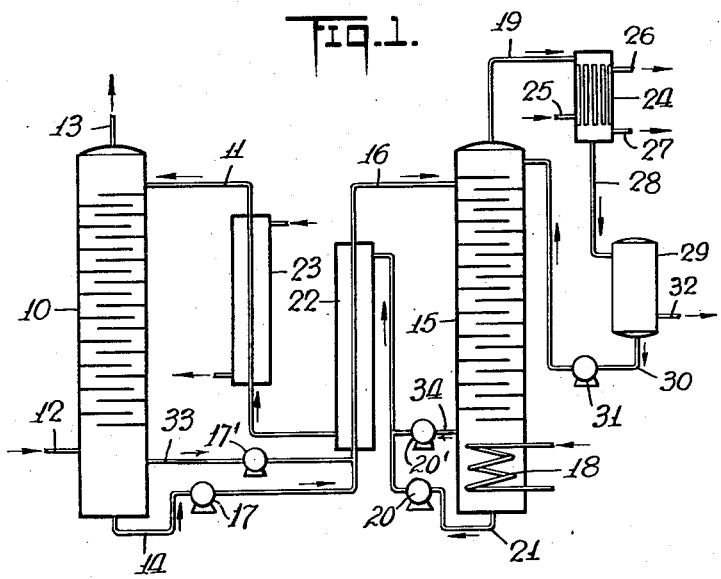

March 9, 1948.  R. B. ANDERSON  2,437,288
SEPARATION OF GASEOUS MIXTURES
Filed Dec. 28, 1943

INVENTOR
Ray B. Anderson
BY
Dean Fairbank & Kirsch
ATTORNEYS

Patented Mar. 9, 1948

2,437,288

UNITED STATES PATENT OFFICE 2,437,288

SEPARATION OF GASEOUS MIXTURES

Ray B. Anderson, Charleston, W. Va.

Application December 28, 1943, Serial No. 515,939

9 Claims. (Cl. 23—2)

My invention relates to processes for treating gas mixtures for separating constituents therefrom, and which processes have broad application to industry. The invention relates specifically to what are known as absorption processes, in which one or more components are separated from a gas mixture by scrubbing the mixture with a liquid which absorbs, either chemically or physically, the component or components to be separated. In most but not all of such processes, the scrubbing liquid, after being separated from the gas mixture, is regenerated by boiling or stripping, or by other means, so that it may be reused for removing additional quantities of the absorbable component or components from additional quantities of the gas mixture. In certain cases, the constituent which is scrubbed from the gas mixture and then removed from the scrubbing liquid is recovered and used or sold as a valuable product in industry. In other cases, the removed constituent is valueless and the purpose is to purify the gas mixture being treated.

A typical example of such processes to which I refer is a method in general use for separating and recovering light liquid hydrocarbons, frequently referred to as natural gasoline, from natural gas. Many natural gases, although essentially methane, contain small percentages of higher molecular weight aliphatic hydrocarbons which can be removed from the gas by scrubbing it with mineral seal or other absorption oil, and which can be subsequently recovered by boiling the oil or stripping it at elevated temperatures with steam. The heavier hydrocarbons thus recovered find general use in industry as "bottled gas" for fuel, and as blending agents for motor and aviation gasoline, and for other purposes. Even though the quantity of heavier hydrocarbons present in the gas does not justify the recovery of gasoline, it may be desirable to install a gasoline absorption plant before the natural gas is introduced into a cross-country pipeline, because, if the heavier hydrocarbons are not removed from the gas, there may be condensation of the hydrocarbons in the gas transmission lines, particularly in cold weather, and there will be an accumulation of liquid hydrocarbon in the transmission lines which interferes with the gas carrying capacity of the lines. The process for recovering natural gasoline from natural gas is operated in a cyclic manner, the absorption oil being continuously circulated between an absorber, where the oil is brought into intimate contact with the natural gas for removal of the heavier constituents from the gas, and a still, where the absorbed hydrocarbons are boiled or stripped from the oil to permit removal and/or recovery of the hydrocarbons and the reuse of the oil.

Another type of process to which I refer is that used for sweetening sour gas by the removal of hydrogen sulphide therefrom, and which process is operated in a cyclic manner similar to that just described, but with a solution, usually aqueous, of an absorbent for hydrogen sulphide, as for example, tripotassium phosphate or an aliphatic amine such as mono-, di- or triethanolamine. Such solution is circulated between an absorber, where the hydrogen sulphide is absorbed from the gas into the solution, and a still, where the hydrogen sulphide is expelled and recovered from the solution and the solution regenerated for reuse in scrubbing additional quantities of sour gas.

A third type of absorption process in general use in industry is that in which a hygroscopic solution is brought into contact with a gas mixture for partially dehydrating the gas mixture. One embodiment of this process is the use of diethylene glycol for dehydrating natural gas to prevent the formation of hydrocarbon hydrates in the transmission lines through which the natural gas is later pumped. The water vapor may have been present in the natural gas as it issued from the ground or it may have been introduced into the gas during the treatment of the gas for gasoline absorption or for hydrogen sulphide removal or for some other purpose. The diethylene glycol is continuously circulated between an absorber, where the moisture is absorbed into the glycol from the gas, and a still, in which the absorbed water is boiled from the glycol to regenerate the glycol for reuse.

All of the above described processes are well known and their value generally recognized. In many instances, particularly in the treatment of natural gas, it is desirable to apply two or more of these processes to the natural gas before it is introduced into the transmission lines.

If the natural gas from the wells contains both gasoline and an acidic gas such as hydrogen sulphide or carbon dioxide, it is common practice to treat the gas first for hydrogen sulphide and/or carbon dioxide absorption, and then gasoline absorption. The gasoline thus recovered is sweet. If the gas is to be put into a transmission line it must lastly be treated for the removal of excess water vapor. Thus the conditioning of some sour natural gas requires three separate treating operations.

Diethylene glycol and aliphatic amines such as mono-, di- and triethanolamine are completely miscible with each other, and it has been found that a mixture of these compounds, or similar compounds, can be circulated for simultaneous removal of hydrogen sulphide and/or carbon dioxide and water vapor from the gas. Such a process has distinct economic advantages over a two step process in which the gas is first treated for hydrogen sulphide and/or carbon dioxide removal and then treated for moisture removal. This combination process, employs a one-phase, dual-purpose absorbent consisting of two miscible solvents. Such a combination process is of little value, however, where a gasoline absorption plant is also installed because, as pointed out above, the removal of gasoline must be carried out after desulphurization but before dehydration, if the full value of each operation is to be realized.

So far as I am aware, neither a dual-purpose absorbent for the simultaneous removal of hydrocarbons and water vapor or acidic gases from natural gas, nor a multiple-purpose absorbent for the simultaneous removal of all three of these constituents, has yet been proposed, although the removal of hydrocarbons from natural gas with the separate removal of one or the other above mentioned components is widely practiced. No one has yet reported a suitable solvent for hydrocarbons which is also a suitable solvent for hydrogen sulphide and/or carbon dioxide and/or water vapor, or which is miscible with a suitable solvent for hydrogen sulphide and/or carbon dioxide and/or water vapor. It is current practice to remove hydrocarbons and one or all of the other mentioned constituents in separate and distinct absorption plants. My invention is a process for accomplishing the simultaneous removal of hydrocarbons and one or all of the other mentioned constituents, hydrogen sulphide, carbon dioxide, and water, in a simple, cyclic absorption plant.

I have found that if a physical liquid mixture of a hydrocarbon constituent, such as mineral seal or other absorption oil, and a water miscible constituent, such as diethylene glycol and/or an aliphatic amine, in the presence or absence of water, is brought into contact with a gas mixture from which it is desired to remove simultaneously, hydrocarbons, and water vapor, and/or hydrogen sulphide, and/or carbon dioxide, satisfactory removal of the constituents takes place. The hydrocarbon layer is not miscible with the water miscible layer, but the two liquids flow as a mechanical mixture through the absorption zone and each constituent removes its component from the gas stream being treated. The advantages of such a combination process are obvious.

After contact with the gas stream being treated has been completed, the absorbent may be regenerated in a single regenerating tower, or the two immiscible constituents of the absorbent may be separated and each regenerated in a separate tower. After regeneration, the mixture may be returned to the absorber for additional scrubbing action, and if two separate regenerator towers have been used, the regenerated liquids from the two towers may be mixed together for reuse in the absorber tower.

In certain instances I have found that regeneration of the two immiscible components of the absorbent in separate towers is highly advantageous. This is particularly true in cases where it is desired to recover the natural gasoline in a sulphur free condition. In such cases it is preferable to separate the water miscible component of the absorbent from the hydrocarbon component after the absorption operation and prior to the introduction of the two components into the desorption region, and then to maintain them separate during the desorption operation, so that the natural gasoline recovered from the hydrocarbon component will not be contaminated with the hydrogen sulphide expelled from the water miscible component during regeneration.

I have also found that separation of the two immiscible components of the absorbent from each other after the absorption operation affords additional important advantages in many cases, even where separate regeneration of the absorbent components is not necessary. If the gas scrubbing operation is carried out at elevated pressure and the immiscible constituents of the absorbent are emulsifiable with each other, these constituents may form an emulsion if they are caused to flow together through the pressure reducing mechanism in the liquid outlet pipe from the absorber. This is doubtless due to the high turbulence produced under the confined conditions of flow which are incident to the passage of the absorbent through the pressure reducing mechanism. If such an emulsion is formed, it may be difficult to separate, and mechanical operation difficulties will result in carrying out the process. Similarly, emulsification has been found to occur in some instances if the two immiscible liquids are pumped back to the absorber tower through a common pump. The turbulence which is incident to the confined flow through the pumping mechanism is again assumed to be the cause of the emulsification. Pressure changing mechanisms, such as pumps or pressure reducing valves or orifices, of course are quite common in gas processing installations of the kind to which the present invention relates, and the various ways in which they are used are well known to those skilled in the art. Hence, it will be understood that in some cases pressure reducing mechanism, such as a valve or orifice, may be required on the liquid outlet side of the absorber tower, while a pressure increasing mechanism, such as a pump, may be required on the liquid outlet side of the desorber tower, or vice versa, or pumping mechanism may be required on both sides of the desorber tower, all depending upon the relative pressures in the two towers and on the manner of operation of the system. The use of such mechanisms of course forms no part of the present invention, but rather, the important feature of the invention has to do with the solution of the problems, such as above discussed, which are encountered by reason of the necessity for employing such mechanisms. In my improved process the above mentioned problem of emulsification is solved by reason of the fact that the emulsifiable liquids are kept separate from each other while they are subjected to the pressure changing conditions which are inherent in the operation of pressure changing mechanisms such as above referred to. For example, where emulsification is found to occur, the heavier water miscible component of the absorbent and the lighter hydrocarbon constituent may be separated by gravity and removed from the absorber tower through separate pipes and pressure reducing mechanisms, and the two components may then be recombined for reactivation in a common tower, or the components may be reactivated in separate towers.

Also, the two components may be passed through separate pumps where pumping of the absorbent components is required.

Numerous modifications and adaptations of my process are possible as will be evident to anyone skilled in the art. The same procedure applies if there be more than two absorbents, each immiscible with the other.

My process may be carried out in various types of apparatus, and intermittently or continuously. In the accompanying drawing, Fig. 1 shows diagrammatically a vertical section through a form of apparatus which may be employed for a continuous process where regeneration is carried out in a single tower, and Fig. 2 shows diagrammatically a vertical section through one form of apparatus which may be employed, to regenerate the two immiscible constituents of the absorbent in separate regenerators.

Figure 2:
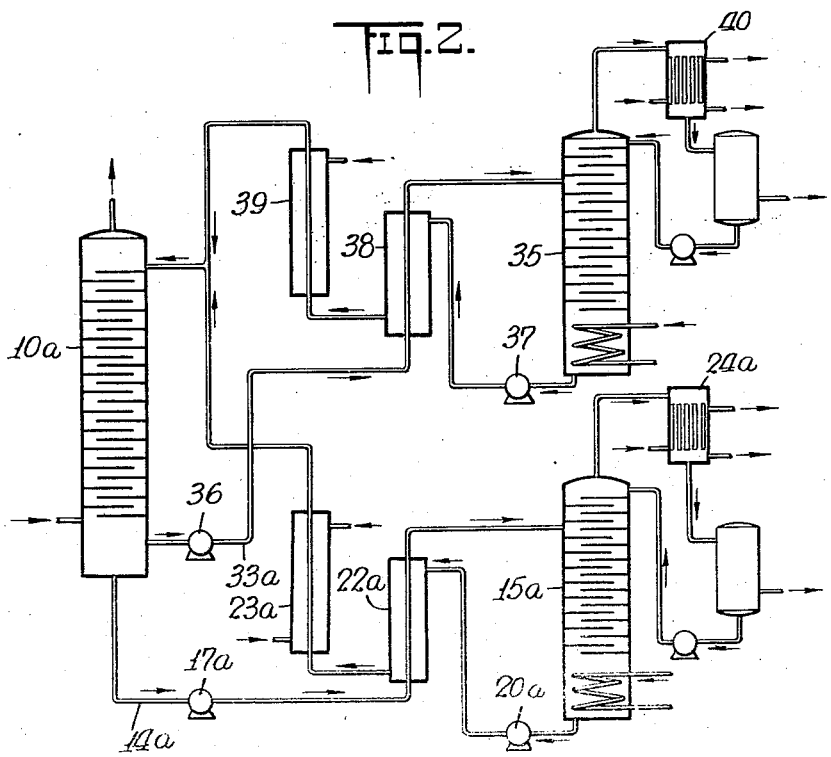

In the apparatus shown in Fig. 1, there is employed an absorber 10 which is preferably in the form of a tower of suitable height and provided with baffles, pebbles, bubble plates, ring packing, or other suitable filler, to effect reduced rate of flow and efficient contact of the downflowing liquid and the upflowing gas. Within the absorber is an absorbing agent, consisting of the two immiscible components. The absorbing agent is continuously delivered to the top of the absorber through a pipe 11, while the gas to be treated is delivered to the lower part through a pipe 12. The stripped gas is taken off from the top of the tower through a pipe 13, while the absorbent, containing the absorbed constituents from the gas, is taken from the bottom through a pipe 14.

In connection with the absorber there is employed a regenerator 15 which has suitable means for effecting intimate contact of the downflowing absorbent agent carrying the absorbed constituents and the upflowing gases and vapors separated from the absorbent in the regenerator. The absorbent, carrying the absorbed materials, is conducted from the pipe 14 through a pipe 16 to the top of the regenerator by means of a pump 17, or by means of the pressure existing in the absorber tower, or by other suitable means. In the bottom of the regenerator is a heating means, such for instance as a steam coil 18. The gases and vapors driven off from the absorbent agent in the regenerator are taken off from the top of the regenerator through a pipe 19, while a pump 20 withdraws the regenerated absorbent through a pipe 21 from the bottom of the regenerator and delivers it to the pipe 11 which leads to the top of the absorber. If the pressure in the regenerator 15 is higher than the pressure in the absorber 10, the pump 20 may not be required.

It is necessary that the temperature of the regenerator be higher than the temperature of the absorber. Thus, it is desirable to heat the liquid delivered through the pipe 16 and to cool the liquid delivered through the pipe 11. This may be accomplished by any suitable form of heat interchanger 22. The liquid flowing from the bottom of the regenerator through the pipe 21 flows through this heat interchanger in one direction while the absorbent from the bottom of the absorber passes through the heat interchanger in the opposite direction on its way to the upper part of the regenerator. The pipe 11 between the outlet of the heat interchanger and the top of the absorber, may be provided with an additional cooler 23. The pipe 16 may be provided with a preheater coil to heat the liquid to a higher temperature after it passes through the heat exchanger.

In carrying out the process, the gas to be treated is delivered through the pipe 12 and passes up through the absorber. The natural gasoline constituents and hydrogen sulphide, carbon dioxide, and/or water vapor, are removed by the action of the hydrocarbon constituent and the water miscible constituent present in the absorbent, and the stripped gas passes out through the pipe 13. The absorbent, containing the absorbed constituents, is removed through the pipe 14, heated by the interchanger 22, and delivered near the top of the regenerator. Within the latter apparatus, the liquid trickles down through to the bottom and gives up the absorbed constituents which later escape through the pipe 19. A further portion of the absorbed constituents are removed by the heating coil 18, and the regenerated absorbent is cooled in the heat interchanger 22, then the cooler 23 and returned for reuse in the absorber. Thus, the process is a continuous one.

In many cases, the liquid in the regenerator may be heated to such a temperature that a portion of one or more of the constituents of the absorbent may be vaporized. To prevent loss of these constituents from the system, it is desirable to add a condenser at the top of the regenerator. I have shown somewhat conventionally a condenser 24 in which a cooling liquid such as water, is circulated around a series of pipes between a supply pipe 25 and an outlet pipe 26. The cooled non-condensible gases leave the condenser through a pipe 27 while all condensate, comprising either one or more constituents of the absorbent or a liquefiable constituent removed from the gas stream, passes from the condenser through pipe 28 to a separator 29 from which a portion of the condensed constituents may be returned through line 30 and pump 31 to the regenerator and another portion of the condensed constituents may be withdrawn through line 32 to utilization or to disposal.

To prevent emulsification of the two immiscible constituents of the absorbent they are separately withdrawn from the base of the absorber 10 through separate pipes after gravity separation. A line 33 may be provided in the base of the absorber for carrying away the lighter of the two constituents. If the absorber is operating under superatmospheric pressure, separate pressure reducing mechanisms may be provided in lines 33 and 14 and the two constituents of the absorbent flowing through these lines may then be recombined before flowing through heat exchanger 22. If the two constituents are to be pumped into the regenerator, another pump, 17' corresponding to pump 17, may be provided in line 33 ahead of heat exchanger 22.

If it is desirable to pump the two constituents of the absorbent separately after regeneration to prevent emulsification, they are permitted to separate by gravity, and the lighter constituent may be removed from the regenerator through a line 34 which is provided with a pump 20' corresponding to pump 20.

Referring to Fig. 2, there is again employed an absorber 10a for contacting the gas with the absorbing agent. The absorbing agent, when it leaves the bottom of the absorber, separates into its two constituents and the heavier constituent is withdrawn through line 14a while the lighter constituent is withdrawn through line 33a. The heavier constituent is regenerated in tower 15a as already described, while the lighter constituent passes to tower 35 for regeneration. Pumps 17a, 20a, 36 and 37, heat exchangers 22a and 38, coolers 23a and 39, and condensers 24a and 40 may be installed and used as previously described.

In this apparatus, the hydrocarbon constituent of the absorbent is regenerated in tower 35 and the gasoline constituents removed from the gas stream are recovered from this tower through condenser 40. The hydrogen sulphide, carbon dioxide, and/or water vapor removed from the gas stream by the water miscible constituents of the absorbent are expelled from the absorbent in tower 15a and are cooled through condenser 24a. The gasoline removed from the gas stream is thus not contaminated by hydrogen sulphide, which may also have been removed.

It will, of course, be obvious that the apparati referred to are conventionally illustrated and may vary in detail through wide limits and may embody suitable units of a character well known to industry. Although I have illustrated countercurrent means for contacting the gas with the absorption medium, it is to be understood that concurrent, semi-concurrent or batch contactors may be employed. It has been found that contactors of the so-called gas lift type, as for example those sometimes referred to as Blaw-Knox contactors, may be especially suitable in certain instances. Also, the immiscible constituents of the absorption medium may be introduced into the absorber at separate points, and at either the same or different levels. The size and capacity of the equipment, as well as the nature of the means employed for effecting absorbing or regenerating action, may vary within wide limits, depending upon the character and volume of the gas treated and the nature and percentage of the constituents which are to be removed from the gas. In some instances, steam serves as a suitable heating agent in the heating coil 18 while water of ordinary temperature may be employed in the cooler 23 and the condenser 24. In other instances, it may be desirable to heat with superheated steam, hot oil, Dowtherm or other suitable medium, and it may be desirable in some instances to cool with substances such as brine or a boiling refrigerant.

Having thus described my invention, what I claim as new and desire to secure by Letters Patent is:

1. The process of removing hydrocarbons and acidic gas from a mixture of gases containing the same, which includes contacting said gas mixture in an absorption operation with a substantially non-emulsified mixture of two emulsifiable absorbent liquids which are substantially immiscible with each other, one of which liquids comprises an absorption oil which absorbs said hydrocarbons and the other of which liquids comprises an amine which absorbs said acidic gas, separating said liquids from the unabsorbed portion of said gas mixture, conducting the liquids from said absorption operation to a desorption operation, regenerating the liquids in said desorption operation, and then returning the regenerated liquids to said absorption operation for further contact of the substantially non-emulsified mixture thereof with additional quantities of said gas mixture to be treated, said liquids in their cyclic flow from said absorption operation to said desorption operation and back to the absorption operation being passed through at least one pressure-changing condition wherein the liquids are subjected to a relatively high degree of confined turbulence such as would tend to produce emulsification of the liquids if they were permitted to pass through such pressure-changing condition while in contact with each other, and said process also including effecting gravity separation of said liquids from each other prior to their passage through at least the first such pressure-changing condition encountered by said liquids after they leave said absorption operation, and causing said liquids to pass separately and out of contact with each other through each such pressure-changing condition, thereby to prevent emulsification of said liquids with each other.

2. The process of removing hydrocarbons and acidic gas from a mixture of gases containing the same, which includes contacting said gas mixture in an absorption operation with a substantially non-emulsified mixture of two emulsifiable absorbent liquids which are substantially immiscible with each other, one of which liquids comprises an absorption oil which absorbs said hydrocarbons and the other of which liquids comprises an amine which absorbs said acidic gas, separating said liquids from the unabsorbed portion of said gas mixture and withdrawing the liquids from said absorption operation, regenerating the liquids in a desorption operation, reintroducing the regenerated liquids into said absorption operation and effecting contact of a substantially non-emulsified mixture thereof with additional quantities of said gas mixture to be treated in the absorption operation, pumping said liquids from one to the other of said operations, effecting gravity separation of the liquids from each other prior to said pumping thereof, and causing said liquids to pass separately and out of contact with each other through the pumping condition, thereby to prevent emulsification of the liquids with each other.

3. The process of removing hydrocarbons and acidic gas from a mixture of gases containing the same, which includes contacting said gas mixture in an absorption operation with a substantially non-emulsified mixture of two emulsifiable absorbent liquids which are substantially immiscible with each other, one of which liquids comprises an absorption oil which absorbs said hydrocarbons and the other of which liquids comprises an amine which absorbs said acidic gas, separating said liquids from the unabsorbed portion of said gas mixture, effecting gravity separation of the liquids from each other, separately conducting the separated liquids to a desorption operation, regenerating said liquids in said desorption operation by effecting separation of absorbed hydrocarbons from said adsorption oil and separately effecting separation of absorbed acidic gas from said other absorbent liquid, and then returning the regenerated substantially non-emulsified liquids to said absorption operation for contact with additional quantities of gas mixture to be treated, said liquids in their cyclic flow from said absorption operation to said desorption operation and back to the absorption operation being passed through at least one pressure-changing condition wherein the liquids are subjected to a relatively high degree of confined turbulence such as would tend to produce emulsification of the liquids if they were permitted to pass through such pressure-changing condition while in contact with each other, said process including maintaining said liquids separate and out of contact with each other as they pass through each such pressure-changing condition, thereby to prevent emulsification of the liquids with each other.

4. The process of treating natural gas to remove therefrom natural gasoline and acidic gas of the group comprising hydrogen sulphide and carbon dioxide, which comprises contacting said natural gas with a substantially non-emulsified mixture of mineral seal oil and an aqueous solution of an amine which is substantially immiscible with said oil and which absorbs said acidic gas, thereby to absorb said gasoline from said natural gas into said oil and to absorb said acidic gas from said natural gas into said amine solution, separating said amine solution and oil from the unabsorbed natural gas, conducting the amine solution and oil from the absorption operation to a desorption operation, regenerating the amine solution and the oil in said desorption operation, and then returning the regenerated amine solution and the regenerated oil to said absorption operation and effecting contact of a substantially non-emulsified mixture thereof with additional quantities of natural gas to be treated, said amine solution and oil as they are conducted between said operations being passed through at least one pressure-changing condition wherein they are subjected to a relatively high degree of confined turbulence such as would tend to produce emulsification of the amine solution and oil if they were permitted to pass through such pressure-changing condition while in contact with each other, and said process including effecting gravity separation of said amine solution from said oil prior to their passage through at least the first such pressure-changing condition encountered by said amine solution and oil after they leave said absorption operation, and causing said amine solution and said oil to pass separately and out of contact with each other through each such pressure-changing condition, thereby to prevent emulsification of said amine solution and oil with each other.

5. The process of removing hydrocarbons, acidic gas and water vapor from a mixture of gases containing the same, which includes providing an absorption medium comprising a substantially non-emulsified mixture of two emulsifiable absorbent liquids which are substantially immiscible with each other, one of which liquids comprises an absorption oil which absorbs said hydrocarbons and the other of which liquids comprises a hygroscopic polyglycol and an amine which absorbs said acidic gas, contacting said gas mixture with said absorption medium in an absorption operation to effect absorption of said hydrocarbons into said oil and absorption of said acidic gas and water vapor into said polyglycol-amine absorbent, separating said liquids from the unabsorbed portion of said gas mixture, conducting the liquids from said absorption operation to a desorption operation, regenerating the liquids in said desorption operation, and then returning the regenerated liquids to said absorption operation and effecting contact of a substantially non-emulsified mixture thereof with additional quantities of said gas mixture to be treated, said liquids in their cyclic flow from said absorption operation to said desorption operation and back to the absorption operation being passed through at least one pressure-changing condition wherein the liquids are subjected to a relatively high degree of confined turbulence such as would tend to produce emulsification of said oil with said polyglycol-amine absorbent if they were permitted to pass through such pressure-changing condition while in contact with each other, and said process also including effecting gravity separation of said oil from said polyglycol-amine absorbent prior to their passage through at least the first such pressure-changing condition encountered by said liquids after they leave said absorption operation, and causing said oil and said polyglycol-amine absorbent to pass separately and out of contact with each other through each such pressure-changing condition, thereby to prevent emulsification of said oil and polyglycol-amine absorbent.

6. The process of removing hydrocarbons acidic gas and water vapor from a mixture of gases containing the same, which includes providing an absorption medium comprising a substantially non-emulsified mixture of two emulsifiable absorbent liquids which are substantially immiscible with each other, one of which liquids comprises an absorption oil which absorbs said hydrocarbons and the other of which liquids comprises a hydroscopic polyglycol and an amine which absorbs said acidic gas, contacting said gas mixture with said absorption medium in an absorption operation to effect absorption of said hydrocarbons from said gas mixture into said oil and absorption of said acidic gas and water vapor from said gas mixture into said polyglycol-amine absorbent, separating said liquids from the unabsorbed portion of said gas mixture and withdrawing the liquids from the absorption operation, regenerating the liquids in a desorption operation, reintroducing the regenerated liquids into said absorption operation and effecting contact of a substantially non-emulsified mixture thereof with additional quantities of said gas mixture to be treated in the absorption operation, pumping said liquids from one to the other of said operations, effecting gravity separation of said oil from said polyglycolamine absorbent prior to said pumping thereof, and causing said oil and said polyglycol-amine absorbent to pass separately and out of contact with each other through the pumping condition, thereby to prevent emulsification of said oil and polyglycol-amine absorbent.

7. The process of removing hydrocarbons, acidic gas and water vapor from a mixture of gases containing the same, which includes providing an absorption medium comprising a substantially non emulsified mixture of two emulsifiable absorbent liquids which are substantially immiscible with each other, one of which liquids comprises an absorption oil which absorbs said hydrocarbons and the other of which liquids comprises a hygroscopic polyglycol and an amine which absorb said water vapor and said acidic gas respectively, contacting said gas mixture with an absorption medium in an absorption operation to effect absorption of said hydrocarbons from said gas mixture into said oil and absorption of said acidic gas and water vapor from said gas mixture into said polyglycol-amine absorbent, separating said absorption medium from the unabsorbed portion of said gas mixture and effecting gravity separation of said oil from said polyglycol-amine absorbent, separately conducting the separated oil and polyglycol-amine absorbent to a desorption operation, regenerating said liquids in said desorption operation by effecting separation of absorbed hydrocarbons from said oil and separately effecting separation of absorbed acidic gas and water vapor from said polyglycol-amine absorbent, and then returning the regenerated liquids to said absorption operation and effecting contact of a substantially non-emulsified mixture thereof with additional quantities of gas mixture to be treated, said liquids in their cyclic flow from said absorption operation to said desorption operation and back to the absorption operation being passed through at least one pressure-changing condition wherein the liquids are subjected to a relatively high degree of confined turbulence such as would tend to produce emulsification of said oil with said polyglycol-amine absorbent if they were permitted to pass through such pressure-changing condition while in contact with each other, and said process also including maintaining said oil and said polyglycol-amine absorbent separate and out of contact with each other as they pass through each such pressure-changing condition, thereby to prevent emulsification of said oil and polyglycol-amine absorbent.

8. The process of removing hydrocarbons and water vapor from a mixture of gases containing the same, which includes contacting said gas mixture in an absorption operation with a substantially non-emulsified mixture of two emulsifiable absorbent liquids which are substantially immiscible with each other, one of which liquids comprises an absorption oil which absorbs said hydrocarbons from said gas mixture and the other of which liquids comprises a highly hygroscopic polyglycol which extracts said water vapor from said gas mixture essentially by direct absorption of the water vapor into said polyglycol, separating said liquids from the unabsorbed portion of said gas mixture and conducting the liquids from said absorption operation to a desorption operation, regenerating the liquids in said desorption operation by separating said hydrocarbons from said oil and separating said water vapor from said polyglycol, and then returning the regenerated liquids to said absorption operation and effecting contact of a substantially non-emulsified mixture thereof with additional quantities of said gas mixture to be treated, said liquids in their cyclic flow from said absorption operation to said desorption operation and back to the absorption operation being passed through at least one pressure-changing condition wherein the liquids are subjected to a relatively high degree of confined turbulence such as would tend to produce emulsification of said oil with said polyglycol if they were permitted to pass through such pressure-changing condition while in contact with each other, and said process also including effecting gravity separation of said oil from said polyglycol prior to their passage through at least the first such pressure-changing condition encountered by said liquids after they leave said absorption operation, and causing said oil and said polyglycol to pass separately and out of contact with each other through each such pressure-changing condition, thereby to prevent emulsification of said oil and polyglycol.

9. The process of removing hydrocarbons and water vapor from a mixture of gases containing the same, which includes contacting said gas mixture in an absorption operation with a substantially non-emulsified mixture of two emulsifiable absorbent liquids which are substantially immiscible with each other, one of which liquids comprises an oil which absorbs said hydrocarbons from said gas mixture and the other of which liquids comprises a highly hygroscopic polyglycol which extracts said water vapor from said gas mixture essentially by direct absorption of the water vapor into said polyglycol, separating said liquids from the unabsorbed portion of said gas mixture and withdrawing the liquids from said absorption operation, regenerating the liquids in a desorption operation by effecting separation of said hydrocarbons from said oil and separation of said water vapor from said polyglycol, reintroducing the regenerated liquids into said absorption operation to effect contact of a substantially non-emulsified mixture thereof with additional quantities of said gas mixture to be treated in the absorption operation, pumping said liquids from one to the other of said operations, effecting gravity separation of said oil from said polyglycol prior to said pumping thereof, and causing said oil and said polyglycol to pass separately and out of contact with each other through the pumping condition, thereby to prevent emulsification of the oil and polyglycol.

RAY B. ANDERSON.

REFERENCES CITED

The following references are of record in the file of this patent:

UNITED STATES PATENTS

| Number | Name | Date |
|---|---|---|
| 989,927 | Saybolt | Apr. 18, 1911 |
| 1,351,151 | Bayer | Aug. 31, 1920 |
| 1,882,289 | Lush | Oct. 11, 1932 |
| 2,161,663 | Baehr | June 6, 1939 |
| 2,177,068 | Hutchinson | Oct. 24, 1939 |

FOREIGN PATENTS

| Number | Country | Date |
|---|---|---|
| 311,693 | Great Britain | Apr. 14, 1930 |
| 417,379 | Great Britain | Sept. 27, 1934 |
| 422,636 | Great Britain | Jan. 16, 1935 |
| 441,104 | Great Britain | Jan. 13, 1936 |

OTHER REFERENCES

Wade, "Dehydration Plant," Gas, Sept. 1936, pages 16 and 17.